(12) United States Patent
Porikli

(10) Patent No.: US 7,826,676 B2
(45) Date of Patent: Nov. 2, 2010

(54) METHOD FOR FILTERING DATA WITH ARBITRARY KERNEL FILTERS

(75) Inventor: Fatih M. Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 908 days.

(21) Appl. No.: 11/683,482

(22) Filed: Mar. 8, 2007

(65) Prior Publication Data

US 2008/0219580 A1 Sep. 11, 2008

(51) Int. Cl.
*G06K 9/40* (2006.01)
(52) U.S. Cl. .................... 382/260; 382/205
(58) Field of Classification Search ............ 382/205, 382/260
See application file for complete search history.

(56) References Cited

U.S. PATENT DOCUMENTS

| | | | | |
|---|---|---|---|---|
| 4,506,228 A | * | 3/1985 | Kammeyer | 329/343 |
| 4,528,639 A | * | 7/1985 | Edwards | 708/290 |
| 5,630,037 A | * | 5/1997 | Schindler | 345/592 |
| 6,847,737 B1 | * | 1/2005 | Kouri et al. | 382/260 |
| 6,944,337 B2 | * | 9/2005 | Jaspers | 382/167 |
| 6,975,329 B2 | * | 12/2005 | Bastos et al. | 345/587 |
| 2002/0159648 A1 | * | 10/2002 | Alderson et al. | 382/260 |
| 2003/0077000 A1 | * | 4/2003 | Blinn et al. | 382/260 |
| 2004/0051909 A1 | * | 3/2004 | Curry et al. | 358/3.08 |
| 2006/0182361 A1 | * | 8/2006 | Ptucha et al. | 382/254 |

* cited by examiner

*Primary Examiner*—Bhavesh M Mehta
*Assistant Examiner*—Gregory F Cunningham
(74) *Attorney, Agent, or Firm*—Dirk Brinkman; Gene Vinokur

(57) ABSTRACT

A computer implemented method filters input data with a kernel filter. A kernel filter is defined, and a set of unique filter coefficients for the kernel filter are determined. A linkage set is constructed for each unique filter coefficient such that the linkage set includes relative links to positions in the kernel filter that have identical filter coefficients, and in which each relative link is an inverse of the position of the unique filter coefficient. Each input data point is processed by multiply values on which the kernel filter is centered by each of the unique filter coefficients, and adding results of the multiplying to the corresponding output data points as referenced by the relative links.

15 Claims, 10 Drawing Sheets

Algorithm 1 Conventional 2D Kernel Filter for all $0 \leq x_1 < N_1$ do
  for all $0 \leq x_2 < N_2$ do
    $sum \Leftarrow 0$
    for all $-K_1/2 \leq k_1 \leq K_1/2$ do
      $c \Leftarrow x_1 + k_1$
      for all $-K_2/2 \leq k_2 \leq K_2/2$ do
        if $(k_1, k_2) \in S$ then
          $sum \Leftarrow sum + f(k_1, k_2) \cdot I(c, x_2 + k_2)$
        end if
      end for
    end for
    $Y(x_1, x_2) \Leftarrow Y(x_1, x_2) / sum$
  end for
end for

*Fig. 2*
Prior Art

Algorithm 2 Minimalist - Single Input Access (Offline) Find Unique Coefficients $w_i, i = 1, \ldots, U$
(Offline) Extract Relative Links $l_{ij}$
for all $1 \leq x_1 < N_1$ do
  for all $1 \leq x_2 < N_2$ do
    $multiplier \Leftarrow I(x_1, x_2)$
    for all $1 \leq i \leq U$ do
      $value \Leftarrow multiplier \cdot w_i$
      for all $l_{ij}$ do
        $k_1 \Leftarrow k_1 + l_{ij}, k_2 \Leftarrow k_2 + l_{ij}$
        $y(k_1, k_2) \Leftarrow y(k_1, k_2) + value$
      end for
    end for
  end for
end for

*Fig. 3C*

Algorithm 3 Minimalist - Single Output Access (Offline) Find Unique Coefficients $w_i, i = 1, ..., U$
(Offline) Extract Relative Links $l_{ij}$
for all $1 \leq x_1 < N_1$ do
  for all $1 \leq x_2 < N_2$ do
    for all $1 \leq i \leq U$ do
      $sum \Leftarrow 0$
      for all $l_{ij}$ do
        $k_1 \Leftarrow k_1 + l_{ij}, k_2 \Leftarrow k_2 + l_{ij}$
        $sum \Leftarrow sum + I(k_1, k_2)$
      end for
      $y(k_1, k_2) \Leftarrow y(k_1, k_2) + w_i \cdot sum$
    end for
  end for
end for

*Fig. 5*

METHOD FOR FILTERING DATA WITH ARBITRARY KERNEL FILTERS

FIELD OF THE INVENTION

This invention relates generally to filtering data, and more particularly, to filtering data with arbitrary kernel filters.

BACKGROUND OF THE INVENTION

In signal and data processing, and particularly, in image processing, kernel filters are frequently applied to input data to produce enhanced output data. A kernel filter works by applying a function to every point in a set of data. Typically, a kernel fitter includes a kernel and a function defined on the kernel. The kernel, which is often a rectangular area of pixels in a 2D image, specifies the region of support for the function. The function is usually in the form of a matrix of filter coefficients. The coefficients of the matrix are the multiplication factors that determine the contribution of each point within the kernel to generate a response of the filter. After all the underlying input data have been multiplied by the filter coefficients, the response at the current point is determined by taking the sum of the products. By selecting different kernel functions, different types of filtering can be performed.

Filtering can be computationally demanding. Therefore, conventional approaches try to break down the original kernel into a convolution of smaller kernels using, for example, scale-scale representations, see P. Burt, "Fast filter transforms for image processing," Computer Vision, Graphics and Image Processing, vol. 16, 20-51, 1981. For a given image, a linear scale-space representation is a family of derived signals defined by convolution of the signal with a Gaussian kernel by concurrently smoothing and sub-sampling the signal. In this way, computationally efficient methods can be obtained.

However, a large number of multiplications are needed to carry out all of the convolutions with a large set of kernels. Therefore, it is also possible to design a 2D filter kernel, and then decompose the filter into a sum of separable one dimensional filters or cascaded representations, see J. Crowley, R. Stern, "Fast computation of the difference of low-pass transform," IEEE Trans. Pattern Anal. Machine Intell., vol. 6, 212-222, 1984, P. Heckbert, "Filtering by repeated integration," ACM SIGGRAPH Computer Graphics, vol. 20:4, 315-321, 1986, and W. Wells, "Efficient synthesis of Gaussian filters by cascaded uniform filters," IEEE Trans. Pattern Anal. Machine Intell., vol. 8:2, 234-239, 1986. This can be done by using either an eigenvalue expansion of the 2D kernel, or application of a singular value decomposition (SVD), see W. S, Lu, H. P. Wang, A. Antoniou, "Design of 2D FIR digital filters by using the singular value decomposition," IEEE Trans. Circuits System, vol. 37, 35-36, 1990, incorporated herein by reference.

By taking advantage of the separability of 2D Gaussian functions, it is possible to decomposed an anisotropic or directionally dependent Gaussian kernel into a one-dimensional Gaussian filter followed by another filter in a non-orthogonal direction, J. M. Geusebroek, A. Smeulders, J. Weijer, "Fast anisotropic Gauss filtering," IEEE Transaction on Image Processing, vol. 12:8, 2003. That method allows fast calculation of edge and ridge maps using convolution and recursive schemes.

A sum-box filter technique approximates a large kernel linear filter to a factor by the sum of the translated outputs of sum-box filters, J. Shen, W. Shen, S. Castan, T. Zhang, "Sum-box technique for fast linear filtering," Signal Process., vol. 82:8, 1109-1126, 2002. That method does not require multiplications. The method uses analysis on scaled spline functions. Their method makes it possible to achieve convolution with a large filter kernel by additions only. Box technique can implement Gaussian filters with multiplications, but cannot be used with linear filters other than Gaussian filters.

Another method is based on a fuzzy domain enhancement method, and a recursive and separable low-pass filter, H. Tang, T. Zhuang, E. X. Wu, "Realizations of fast 2-D/3-D image filtering and enhancement," IEEE Trans Medical Imaging, vol. 20:2, 32-40, 2001. They process each pixel independently and modify both dynamic range and local variations. That method is also only applicable to Gaussian functions.

One method solves non-linear partial differential equations based on an adaptively determined vector field specifying non-local application points, B. Fischl, E. L. Schwartz, "Adaptive non-local filtering: A fast alternative to anisotropic diffusion for image enhancement," IEEE Trans. Pattern Anal. Machine Intell., vol. 21:1, 42-48, 1999. Their method speeds up image enhancement, but is not applicable to linear filters.

Many filtering methods use orientation estimation for adaptation of local spatial texture. That often implies a sampling of orientations by anisotropic filtering. For a linear orientation scale-space, the anisotropic Gaussian function is the best suited causal filter. Orientation analysis is often approached by a set of steerable anisotropic filters.

Freeman et al. describe conditions under which a filter can be tuned to a specific orientation by making a linear combination of basis filters, W. T. Freeman, E. H. Adelson, "The design and use of steerable filters," IEEE Trans. Pattern Anal. Machine Intell., vol. 13, 891-906, 1991. According to their framework, no exact basis exists for rotating an anisotropic Gaussian.

A method for generating a finite basis, which approximates an anisotropic Gaussian function is described by P. Perona, "Steerable-scalable kernels for edge detection and junction analysis," Image Vis. Comput., vol. 10, 663-672, 1992. However, the number of basis filters is large, and the basis filters are non-separable, requiring high computational performance.

There are other methods that use reconfigurable hardware, or processor adapted software to accelerate the filtering process. Graphic processing unit (GPU) implementations of image filtering methods are also available, especially for the computation of area sums using pyramid representations, J. Kruger, R. Westermann, "Linear algebra operators for GPU implementation of numerical algorithms," ACM Transactions on Graphics, vol. 22:3, 908-916, 2003.

Another GPU-based filtering of images with cubic B-splines that exploits bilinear texture interpolations is described by C. Sigg, M. Hadwiger, "Fast third-order texture filtering," Matt Pharr, editor, GPU Gems 2: Programming Techniques for High-Performance Graphics, 313-329, 2005. While that technique allows for random access to a texture image, it requires a considerably number of texture lookups per pixel.

Strengert et al. show that GPUs can implement pyramid methods based on bilinear texture interpolation, and describe three examples: zooming with bi-quadratic B-spline filtering, efficient image blurring of arbitrary blur width, and smooth interpolation of scattered pixel data, M. Strengert, M. Kraus, T. Ertl, "Pyramid Methods in GPU-Based Image Processing," In Proc. 11th International Fall Workshop Vision, Modeling, and Visualization, 2006.

In summary, most fast filtering methods either strictly depend on the shape of the filter function, or provide minor computational improvements.

SUMMARY OF THE INVENTION

The embodiments of the invention provide a method for filtering input data with kernel filters that have multiple identical filter coefficients. Such filters, e.g., Gabor filters, moving averages, gray level morphological operators, volume smoothing functions, quad-symmetric filters, and the like, are widely used in many computer imaging and vision tasks. As an advantage, the method according to the invention is not limited to a particular filter shape.

The invention takes advantage of the spatial arrangement of filter coefficients and overlap between the kernels of neighboring data points to prevent redundant multiplications when filtered output data are generated.

One embodiment of the invention determines a set of unique filter coefficients, and constructs a set of relative links corresponding to the filter coefficients. Then, the input data are processed by accumulating the responses at each point while applying the filter coefficients using their relative links to produce the output data.

The invention provides dual solutions, single input access and single output access, which achieve a 40% performance improvement, on average, when compared with conventional filter processing. In addition to computational advantage, the method uses a minimal amount of memory, which makes the method ideal for hardware implementations.

BRIEF DESCRIPTION OF THE DRAWINGS

FIG. 2 is a block diagram of pseudo code of a prior art filtering method;

FIG. 3C is a block diagram of pseudo code of a filtering method according to an embodiment of the invention;

FIG. 5 is a block diagram of pseudo code of the dual method of FIG. 4;

DETAILED DESCRIPTION OF THE PREFERRED EMBODIMENTS

Figure 1:
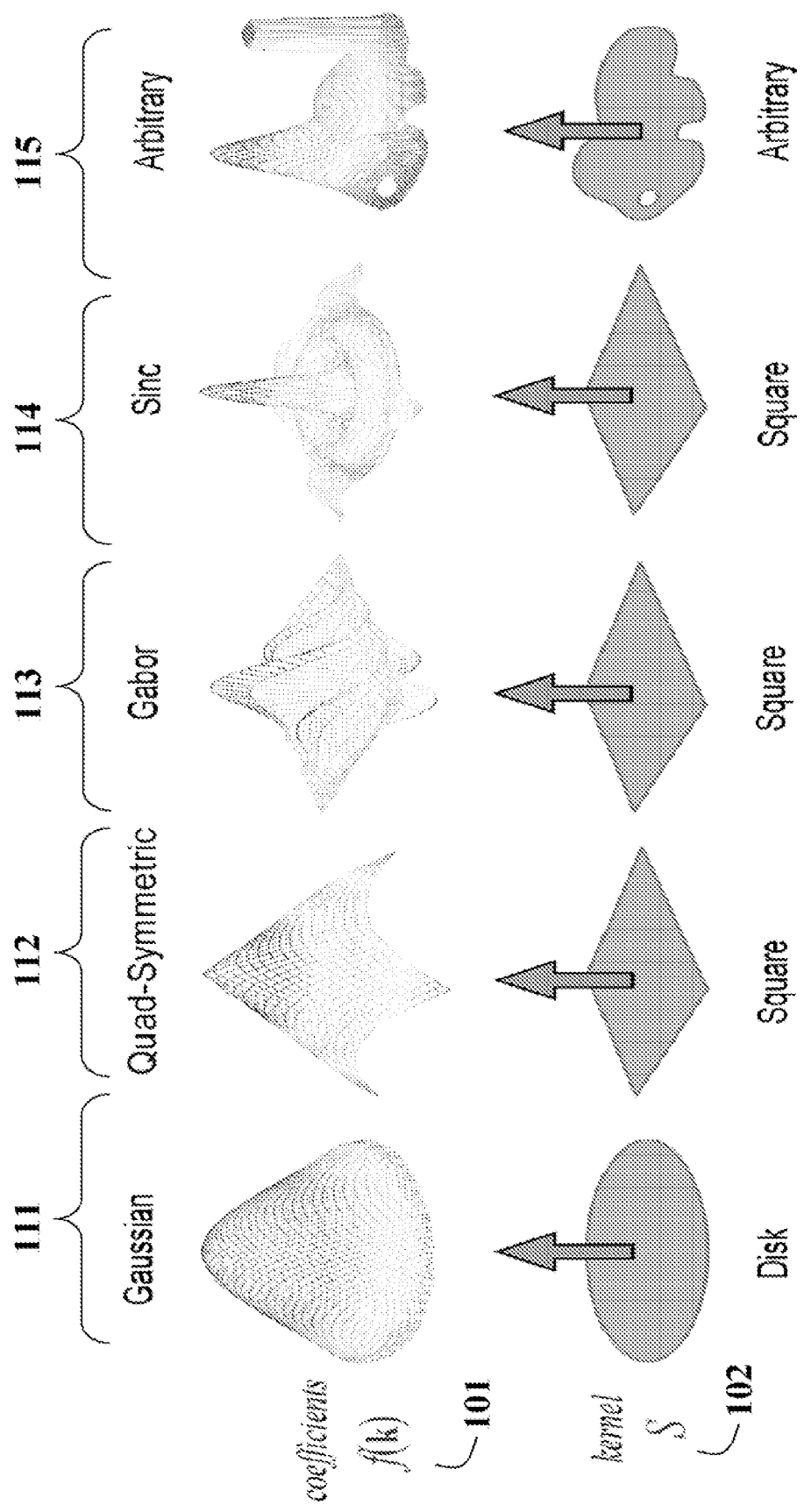
FIG. 1 is a diagram of kernel filters used by the embodiments of the invention.

The embodiments of my invention provide a method for filtering input data with kernel filters, as shown in FIG. 1, to produce output data as a filter response. Kernel filters are often applied to an input image to produce an enhanced output image. In such an application, a value (intensity or color) of a pixel at the center of the kernel is replaced by a value that is determined by neighboring pixel values supported by the kernel. Although the invention is described using an example application, where the data are two-dimensional, it should be understood that the invention can be worked with data having other dimensionalities.

FIG. 1 shows some example kernel filters that can be used by my invention. Typically, a kernel filter includes by a filter function 101 as shown in the top row, and a corresponding a kernel 102 shown in the bottom row. The filter function $f(k)$ 101 is usually in the form of a matrix of filter coefficients, and the shape S of the kernel 102 can be disk, square, or arbitrary. The example kernel filters shown include a Gaussian filter 111, a quad-symmetric filter 112, which is also a superset of Gaussian filters, a Gabor filter 113, a sine or low-pass filter 114, and an arbitrary filter 115. Symmetrical filter functions are usually defined within a disk shaped kernel. However, for implementation simplicity, square or rectangular kernels often are used in practice. One example of arbitrary shaped kernels is a template enhancing gray level morphological filter. Some of these filters are now described in greater detail.

Gabor Filters

A Gabor filter is a linear filter having an impulse response that is defined by a harmonic function multiplied by a Gaussian function. Because of the multiplication-convolution property, the Fourier transform of the impulse response of the Gabor filter is the convolution of the Fourier transform of the harmonic function and the Fourier transform of the Gaussian function.

Therefore, Gabor filters have optimal localization properties in both the spatial and the frequency domain. Therefore, Gabor filters are well suited for many applications such as texture segmentation, target detection, iris recognition, image coding and image representation.

A Gabor filter can be expressed as: $f(x_1, x_2) = s(x_1, x_2)g(x_1, x_2)$ where $s(x_1, x_2)$ is a harmonic function, known as a carrier, and g is a 2D Gaussian function, known as an envelope. The carrier is generally assigned as a real function:

$$s(x_1, x_2) = \cos\left(2\pi \frac{x'}{\lambda} + \psi\right),$$

where $$x' = x_1 \cos\theta + x_2 \sin\theta,$$

and the envelope is $$g(x_1, x_2) = \frac{1}{2\pi\sigma_{x1}\sigma_{x2}} \exp\left(\frac{-x_1^2}{2\sigma_{x_1}^2} + \frac{-x_2^2}{2\sigma_{x_2}^2}\right).$$

In above formulation, $\lambda$ represents the wavelength, $\theta$ represents spatial central frequency, $\psi$ is the phase offset, and $\sigma_{x1}$, $\sigma_{x2}$ are the standard deviations of the elliptic Gaussian envelope. Generally, a filter bank, which includes Gabor filters with various scales and rotations, is used to cover all frequency space.

Quad-Symmetric Filters

A quad-symmetric filter is a linear kernel filter useful for applications such as image denoising, illumination correction, motion estimation, and video processing. The quad-symmetric filter replaces a pixel at the center of the kernel by a weighted mean of neighboring pixels. The quad-symmetric filter can be expressed as $$f(x_1, x_2) = g(|(x_1 - x^c_1, x_2 - x^c_2)|),$$

where g is a function of an arbitrary shape, and $(x_c, y_c)$ is the center of the kernel. The quad-symmetric filter is easy to adapt to a given context as long as a distance can be determined between two pixel values. The quad-symmetric filter is also non-iterative, thereby achieving satisfying results with only a single pass. Even though the filter is very useful, it relatively slow. Brute-force computation for reasonably sized image can be on the order of tens of minutes. Nonetheless, solutions are known to speed up the evaluation of the quad-symmetric filter, e.g., specialized filters that perform an exact computation but are restricted to a specific scenario, and approximated filters that do not produce exact results or that rely on down-sampling, and low-pass filtering in a higher-dimensional space.

Minimalist Filtering

My kernel filter is defined in a d-dimensional real valued Cartesian space $R^d$. The filter maps the input data I within the kernel filter S centered around a data point $p=[x_1, \ldots, x_d]$ in the space, to a m-dimensional response vector or output data:

$$I(p; S) \to y(p) = [y_1, \ldots, y_m].$$

We consider linear filters that maps to a scalar, that is, m=1, thus $y(P)=y_1$, without loss of generality. The filter assigns a real valued coefficient $f(p)$ to each of the data points p in the kernel S. The data to be filtered are bounded within a range $N_1, \ldots, N_d$, i.e., $0 \leq x_i < N_i$. Note that, single channel image filters are defined in d=2, color and video filters are defined in d=3, as the temporal component constitutes the third dimension.

Given this notation, the response of the kernel filter can be expressed as $$y(p) = \sum_{k \in S} f(k) I(k+p), \qquad (1)$$

which is the same as the correlation. Because the response can be determined by a bounded set of filter coefficients in a single pass, kernel filters are also finite impulse response (FIR) filters. For conventional 2D image filtering with a square kernel bounded within $[-K_1/2, K_1/2]$, $[-K_2/2, K_2/2]$, the response becomes $$y(x_1, x_2) = \sum_{k_1=-K_1/2}^{K_1/2} \sum_{k_2=-K_2/2}^{K_2/2} f(k_1, k_2) I(x_1+k_1, x_2+k_2).$$

The response can be modified for convolution by changing the signs.

FIG. 2 shows pseudo-code for a conventional kernel filtering method.

Even though it is tempting to implement the above formulation with no changes, I emphasize the fact that, it also causes the multiplication of the pixel value with the same coefficients over and over again when the kernel contains the same coefficients, regardless of their position within the kernel. This wastes time and resources.

Figure 3A:
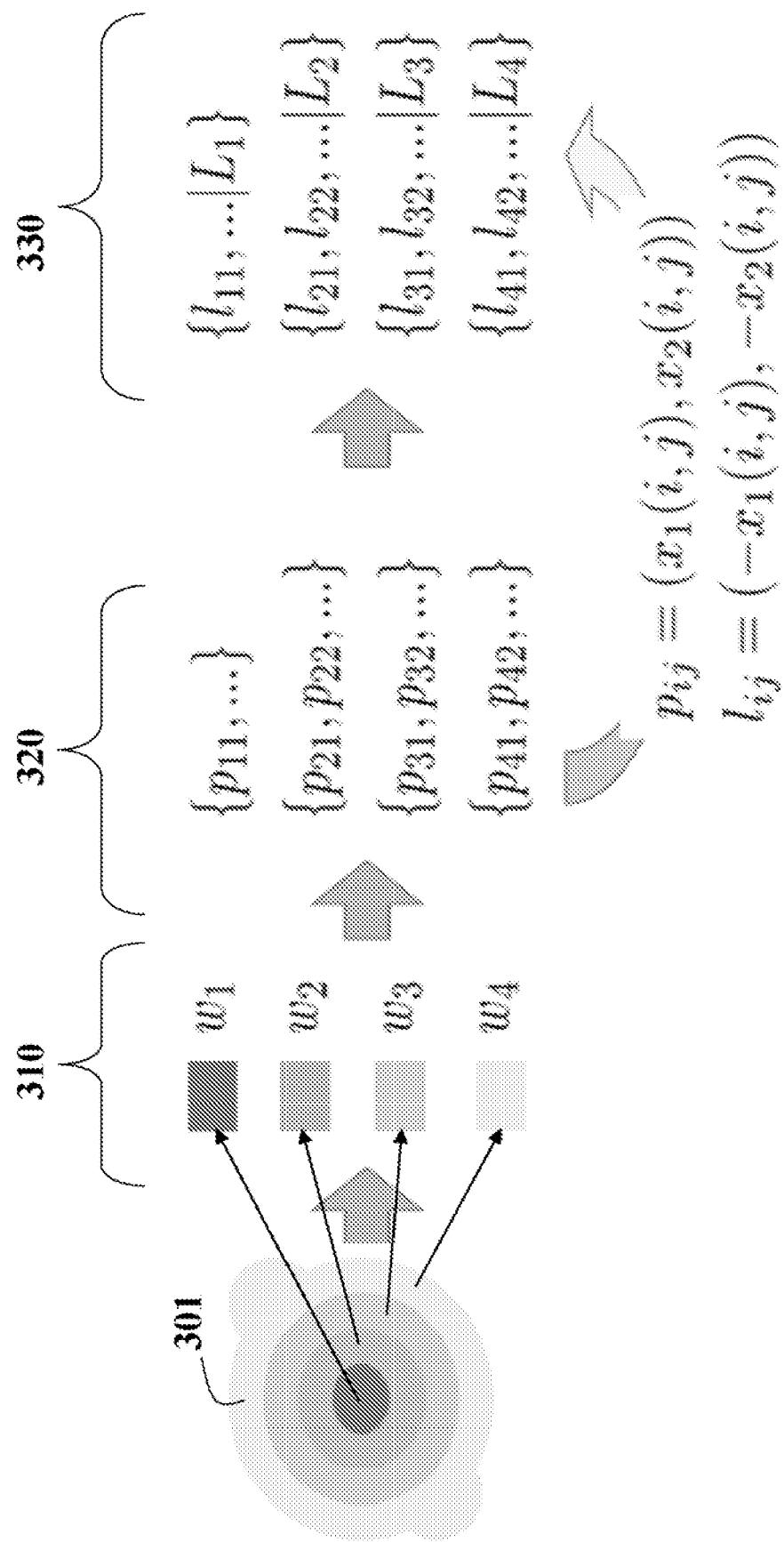
FIG. 3A is a block diagram of an off-line phase of a filtering method according to an embodiment of the invention.
Figure 3B:
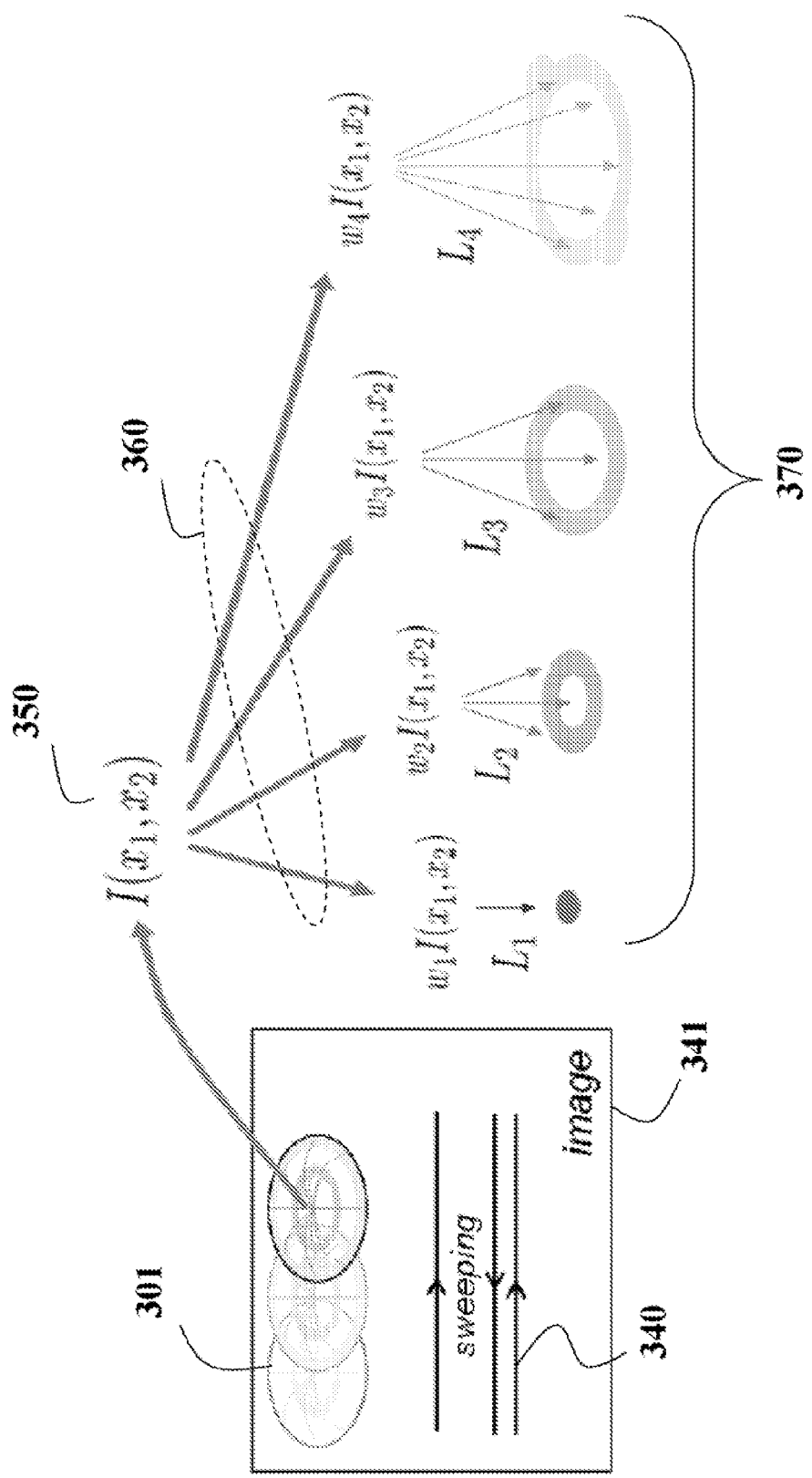
FIG. 3B is a block diagram of an on-line phase of a filtering method according to an embodiment of the invention.

Therefore, the minimalist filtering method according to one embodiment of the invention first determines a set of unique filter coefficients $w_i$, i=1, . . . , U 310 as shown in FIGS. 3A-3C. Then, based on the points 320, the method constructs a linkage set $L_i$ 320 for each unique filter coefficient $w_i$ such that the linkage set includes relative links to the positions in the filter that have identical filter coefficients $$L_i = \{l_{i0}, \ldots, l_{iL_i}\}.$$

Each relative link $l_{ij}$ is an inverse of the position of the filter coefficient, i.e., if the filter position is $(x_1, x_2)$ then the relative link is $(-x_2, -x_2)$ with respect to indexing the kernel. The unique filter coefficients and relative links are predetermined one time for the kernel filter in an off-line or preprocessing phase.

After I determine the unique filter coefficients 310 and relative links 330, I process the data one input point at a time. I multiply the values on which the kernel is centered by each of the unique filter coefficients, and add the result to the responses of the multiple output points as referenced by the relative links:

$$\begin{aligned} w_1 I(p) &\to y(p+l_{11}), \ldots, y(p+l_{1L_1}) \\ &\vdots \to \vdots \\ w_U I(p) &\to y(p+l_{U1}), \ldots, y(p+l_{UL_U}). \end{aligned} \qquad (2)$$

As shown in FIG. 3A, the minimalist filtering method first determines the unique filter coefficients $w_i$, i=1, . . . , U 310 for each position in some arbitrarily shaped kernel 301 in a one time, off-line phase. Then, the method determines the points 320 that have the same coefficients, and the corresponding relative links 330. That is, the method determines:

$$p_{ij} = (x_1(i,j), x_2(i,j)), \text{ and}$$

$$l_{ij} = (-x_1(i,j), -x_2(i,j)).$$

FIG. 3B shows the on-line phase of my method where the kernel 301 is 'swept' 340 across the image 342, e.g., in a line or 'raster' scan order. For data point (pixel) $I(x_1, x_2)$ 350, the points are weighted 360 using the corresponding relative links 370.

Instead of multiplying filter matrix directly with the underlying data, the minimalist filtering method selects the unique filter coefficients, and then multiplies the input pixel values only once for each unique filter coefficient, while adding the results to the corresponding output pixels using the corresponding relative links.

This method is suitable for stream processors where a size of cache size is limited. Thus, the amount of data that needs to be accessed is minimized. In a single input access, the filter response is progressively determined, and the output is produced when all the points in the kernel are processed as shown in the pseudo code of FIG. 3C.

Figure 4:
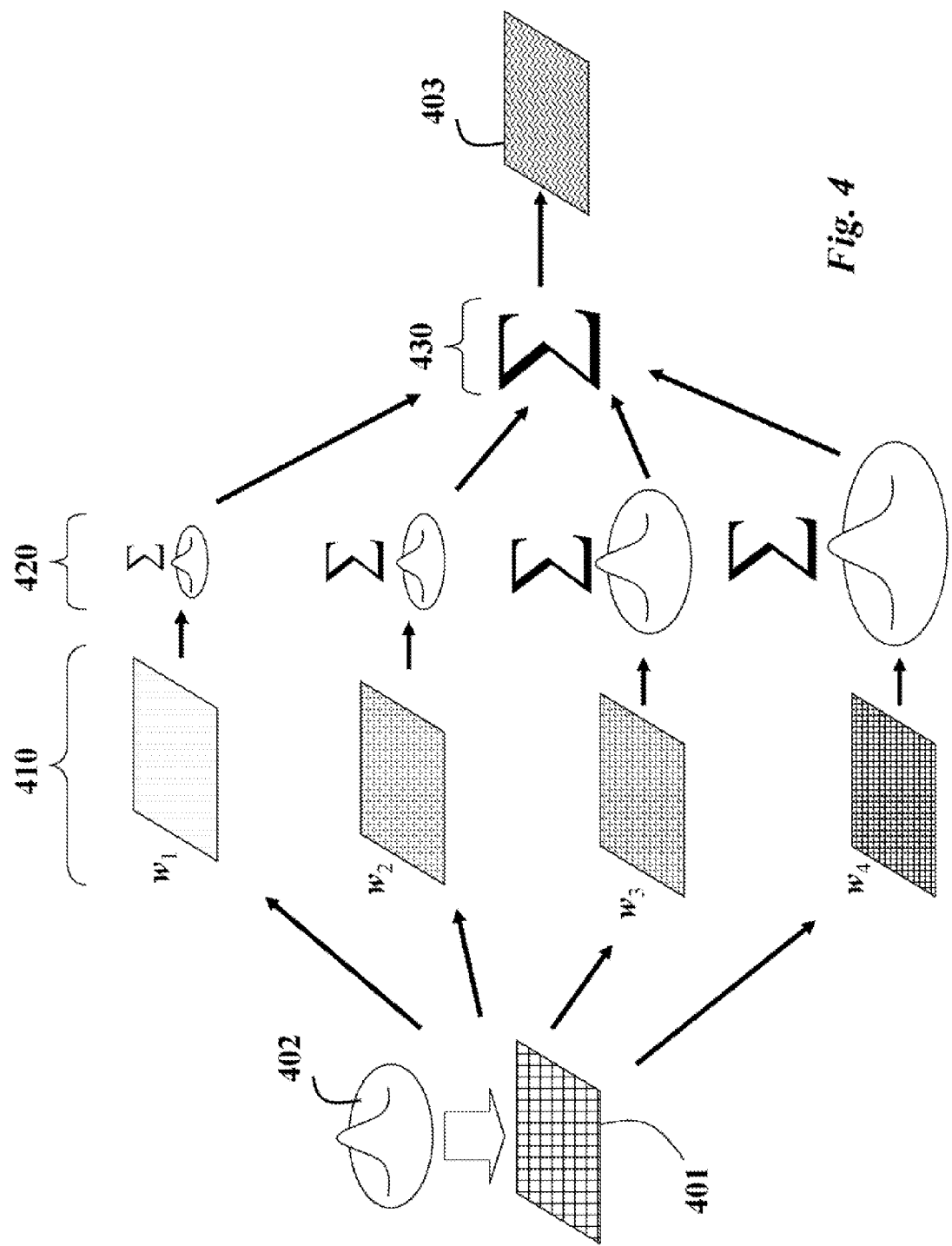
FIG. 4 is a block diagram of a dual filtering method according to an embodiment of the invention.

As shown in FIG. 4, I also describe a dual method for filtering an image 401 with a filter kernel 402 to produce a filtered image 403. A kernel sized block 410 of input is processed each iteration. As above, I find the unique coefficients $w_i$ and the relative link sets. The dual method takes the inputs within the current kernel and finds the summation 420 of the points for each relative link. Then, the method multiplies these summations with the corresponding unique coefficients to assign the value of the output point and aggregates 430 the sums:

$$y(p) = \sum_{i}^{U} \left( w_i \sum_{j}^{L_j} I(p+l_{ij}) \right). \qquad (3)$$

FIG. 5 shows the pseudo code for the dual method that determines the response for a single output point with a single output access.

In this manner, the filter response for a single output point is determined. Because the image is multiplied once for each unique coefficient, this method can take advantage of GPUs to further accelerate the filtering.

It should be understood that the above described methods can be implemented in a digital processor or application specific integrated circuit (ASIC), Computational Improvements In Table A, I show a detailed computational complexity analysis in terms of the relative cost of processor operations, which is usually measured against the cost of an integer addition operation.

TABLE A

| Operator | A | B | C | D | Our |
|---|---|---|---|---|---|
| Integer addition | 1 | 1 | 1 | 1 | 1 |
| Integer multiply | 4 | 4 | 24 | 4 | 1 |
| Float addition | 20 | 3 | 4.2 | 4 | 15 |
| Float multiply | 20 | 5 | 113 | 4 | 15 |
| Logical operator | 1 | — | — | 2 | 1 |
| Array indexing | 6d − 4 | — | — | 7d − 3 | 2d − 1 |

In the Table A, I present the relative costs of the basic operations for conventional methods as well as ray results. Because the cost of the array indexing becomes comparable for higher dimensional data, I also consider the cost of array indexing. For an d-dimensional array of data points, accessing the data requires d integer additions, d−1 integer multiplications. I observed that due to hardware integrated use a multiplication-accumulation unit, (MAC) on a processor, the costs of the addition and multiplication remain equal for the same data types.

In Table A, the Operator column shows the various operations. Column A is the relative cost of the basic processor operators as described by S. Oualline, "Practical C++ programming," O'Reilly & Associates, ISBN: 1-56592-139-9, 1995. Column-B is the cost of the operators executed on a P4 processor that uses streaming SIMD and Prescott arithmetic operations, R. Bryant, D. O'Hallaron, "Computer systems: a programmer's perspective," Prentice Hall, ISBN 0-13-034074-1, 2003. Column-C is the relative costs on a P4 running C++ compiler, J. Mathew, P. Coddington, K. Hawick, "Analysis and development of Java grande benchmarks," Proceedings of ACM, 1999. Column-D for a Intel P4 processor running MSVC++ compiler, F. Porikli, "Integral histogram: a fast way to extract histograms in Cartesian spaces," Proc. Computer Vision and Pattern Recognition Conference, vol. 1, 829-836, 2005. The last Column is the cost for my method.

Suppose the input data has floating point values, and the total number of points in the kernel is A, i.e. for a rectangular kernel $A=\pi_i^d K_i$. The conventional kernel filtering method requires the following tasks to compute the filter response:

Find indices of current points: A d-dimensional array indexing and 2A additions, Check whether current point is in the kernel: d-dimensional array indexing and comparison, Multiply by filter coefficients: A multiplications, Assign sum of multiplications: A−1 additions and d-dimensional array indexing.

For a single data point, the conventional filtering requires 2A+(2d−1)A operations for computing the indices of the contributing points within the kernel in data space and accessing their values respectively. In case of using a non-rectangular kernel, there are two possible control conditions to determine whether a point belongs to the kernel or not; either using a larger fitting rectangular array and a binary mask representing the kernel membership, or computing a distance based criterion from index values, I observed from my results that using a mask reduces the computational load. The checking stage requires (2d−1)A+A=2dA operations.

The floating-point value of each data point within the kernel is multiplied by the corresponding filter coefficient, resulting in 15A operations. Computing the floating-point sum of multiplications takes 15(A−1) operations, while assigning the sum as the filter response takes only 2d−1 operations. Note that the previous computations are repeated for each of the $N_1 \times \ldots \times N_d$ points in the data. Then, the total number of operations needed for all candidates becomes $$[(4d+31)A+2d-16]\prod_j^d N_j. \qquad (4)$$

On the other hand, the minimalist filtering does not repeat the multiplication with the same coefficients and does not need a checking conditional for arbitrary shaped kernels. Before the application of the kernel filter, the filter is preprocessed to determine the unique coefficients and constructs sets of relative links for each unique coefficient. Note that, this is done only once for the filter in the off-line phase. That is, it is not duplicated during the actual on-line filtering process. After this off-line phase, the minimalist filtering requires these steps:

1) Get current point value: d-dimensional array indexing,
2) Multiply by unique coefficients: U multiplications,
3) Find indices of points: $\Sigma l_i$ d-D array indexing and $2\Sigma L_i$ additions,
4) Increment point values: $\Sigma L_i$ additions.

At each data point, the minimalist filtering employs 2d−1 operations to get the value of the current data point. Then, the floating-point value is multiplied by each of the unique coefficients, which takes 15 U operations. Because the total number of the relative links is equal to total number of points in the kernel $\Sigma_i^U L_i=A$, finding indices of the points within the kernel requires 2A integer additions for converting relative links to the data point indices and A array indexing, which results in (2d+1)A operations. As a result, the computational load of this stage is (2d+1)A operations.

The corresponding multiplication results are added to the filter responses of output array data points. This involves 15A operations for floating-point additions and (2d−1)A operations for accessing the output array. The total number of operations then becomes:

$$[(4d+15)A+2d-1+15U]\prod_j^d N_j. \qquad (5)$$

I define a reduction ratio that corresponds to the percentage of computational savings accomplished by the minimalist filtering as $$R = \left(1 - \frac{(4d+15)A+2d-1+15U}{(4d+31)A+2d-16}\right) \times 100. \qquad (6)$$

This number represents how many percent of the computations is prevented by using the minimalist filtering. I also provide a redundancy score as $$\delta = (1-U/A) \times 100 \qquad (7)$$

to represent the ration of unique coefficients to all.

Effect of Quantization, Symmetry & Separability

The success of the minimalist filtering comes from the smaller number of unique coefficients. In case this number is big, i.e., equal to total number of points in the kernel U=A. Thus, the minimalist filtering reduces to conventional filtering. However, almost all of the kernel filters have very small unique coefficient numbers. Quantizing is a competent way of obtaining a smaller number of unique coefficients. For the 2D kernel filters that are symmetric around the kernel origin, the minimum redundancy score is 75%. In other words, even without any quantization, my minimalist filtering method still significantly reduces the required computations to a quarter of the original load.

To provide a throughout analysis, I tested widely used filters: Gaussian, quad-symmetric, Gabor, sine, and edge filters. Table B shows the average computational savings at 50 dB for the various 2D filters on 21×21 kernels.

TABLE B

| Gaussian | Quad-Symmetric | Gabor | Sinc | Edge |
|---|---|---|---|---|
| 40.3% | 40.1% | 38.2% | 37.7% | 41.5% |

Figure 6:
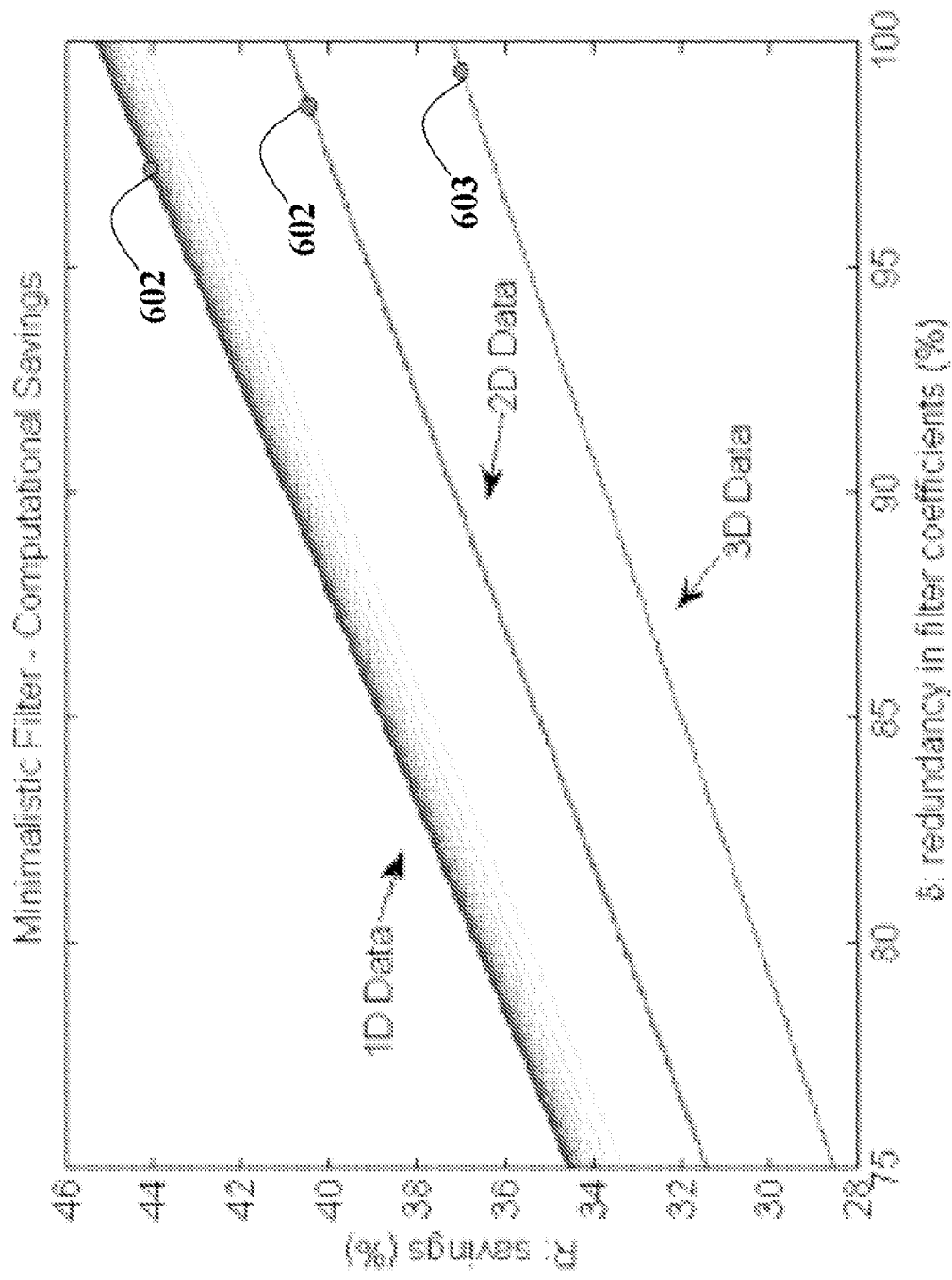
FIG. 6 is a graph comparing the computational reduction ratio (R) as a function of redundancy in filter coefficients for multi-dimensional data.

I also analyzed the performance changes in different dimensional data. As shown in FIG. 6, the savings increases as the dimensionality decreases, partially a result of the array accessing costs. Note that, the savings are much higher for lower dimensional data. In other words, the minimalist filtering provides even much higher gains when using lower dimensional separable kernels. In addition, for higher dimensions, the savings becomes independent from filter size. FIG. 6 also shows that for separable filters, the improvements are even higher. As shown, the computational savings increases as the number of redundant coefficients increases. The dots 61-603 show an average gains 43%, 40.5%, and 37% without any noticeable change in the outputs.

Figure 7:
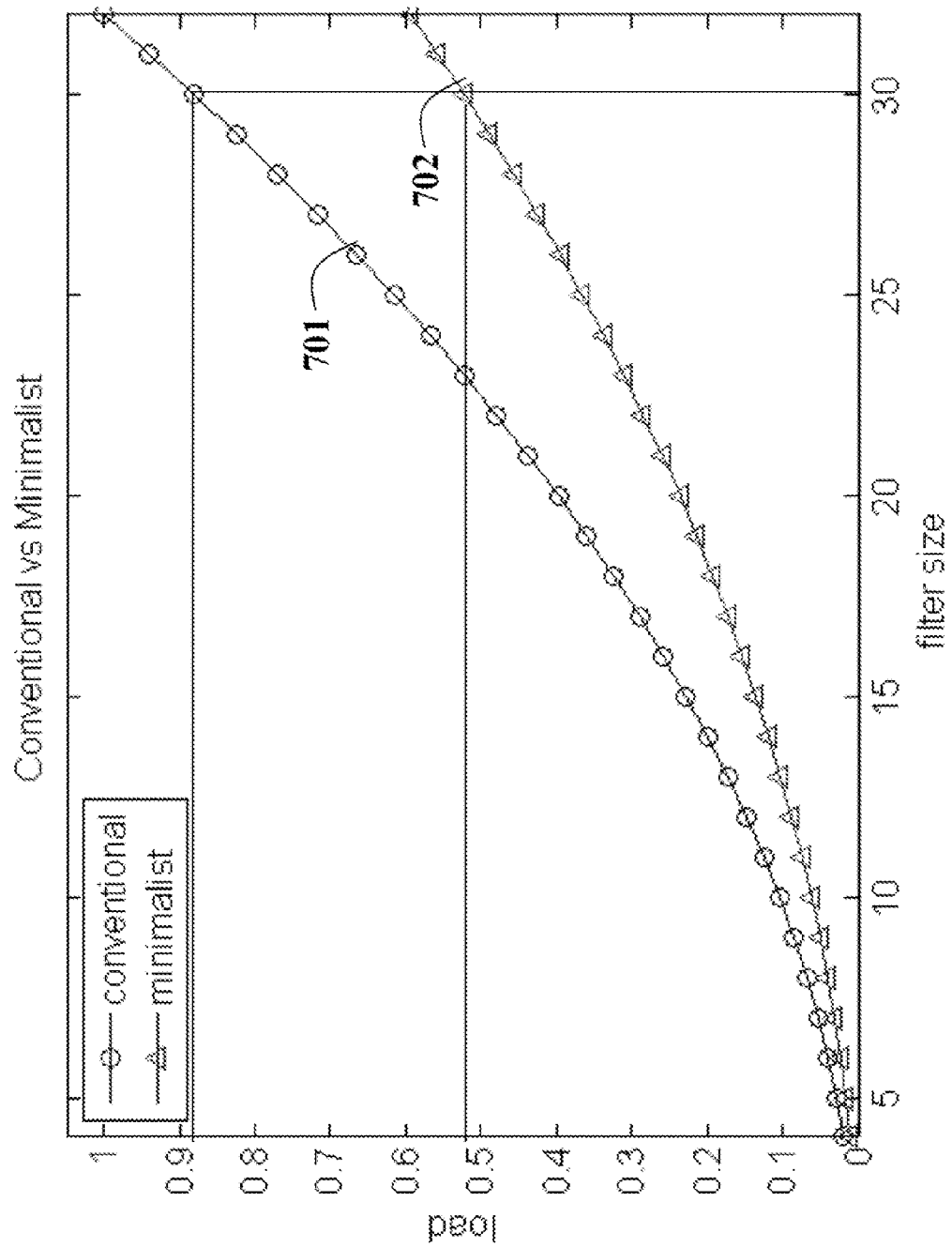
FIG. 7 is a graph comparing computational load as a function of filter size for conventional filtering and filtering according to an embodiment of the invention.

FIG. 7 compare conventional filtering 701 with the minimalist 2D kernel filtering 702 according to my invention as a function of load and filter size. As the kernel size increases, the minimalist method becomes more advantageous. For example, the load for a filter size 30 is about 40% less.

Figure 8B:
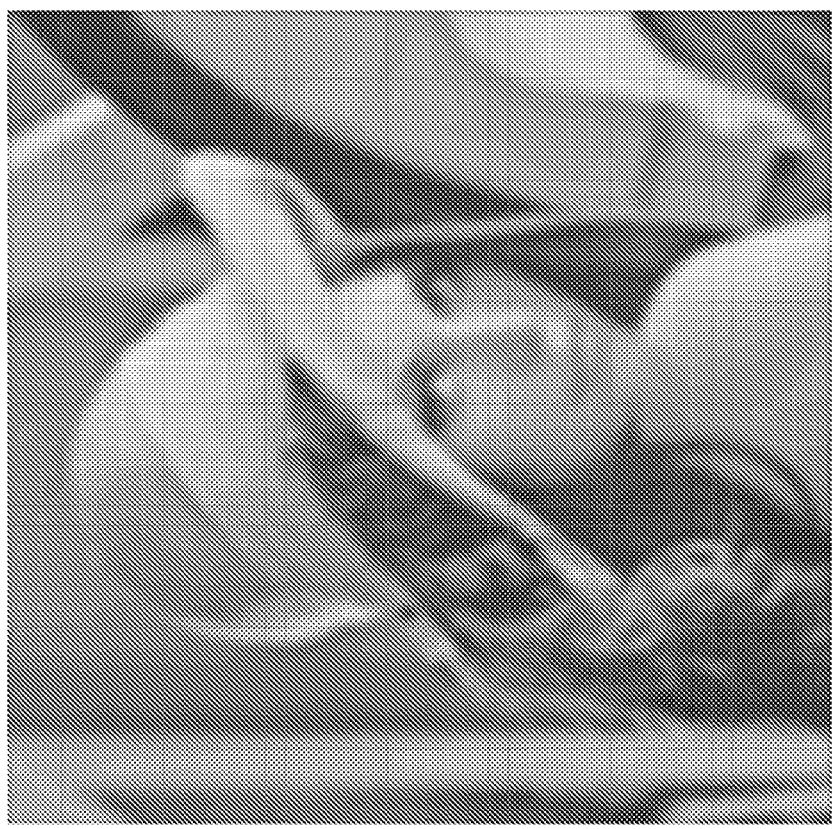
FIGS. 8A and 8B are respectively images with conventional filtering and filtering according to an embodiment of the invention.
Figure 8A:
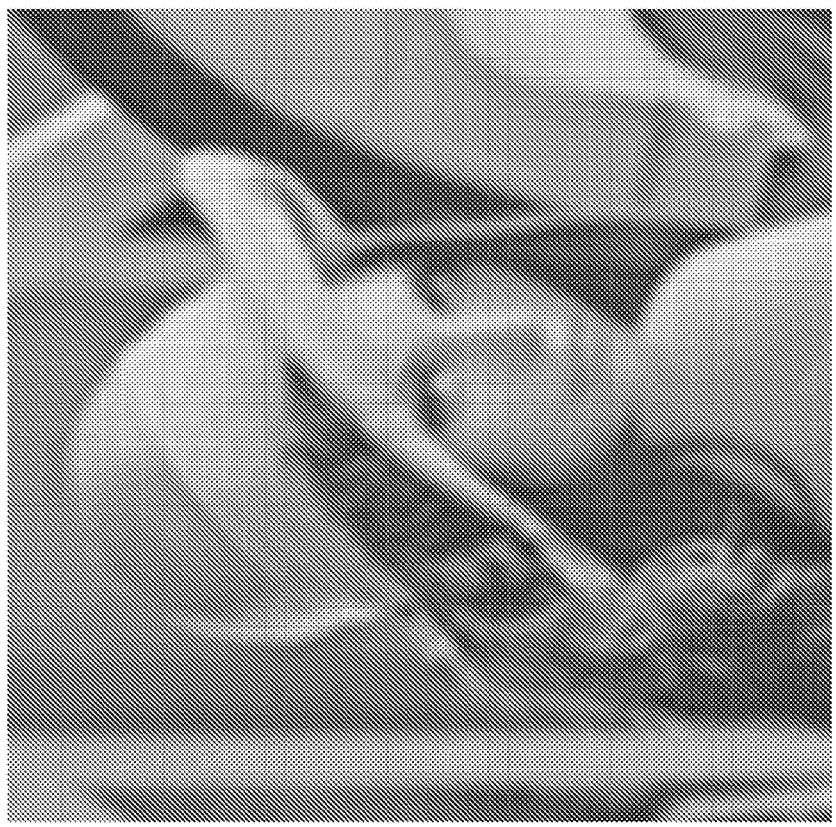

FIGS. 8A-8B show that there is no visible difference between conventional and minimalist filtering at 50 dB filtering using a 13×13 quad-symmetric kernel. FIG. 8A shows conventional quad-symmetric filtering with no redundancy, and FIG. 8B shows minimalist filtering with 98% redundancy.

EFFECT OF THE INVENTION

The invention provides a novel minimalist filtering method that accelerates the application of kernel filters that have multiple identical coefficients. My method takes advantage of the overlap between kernels to reduce redundant multiplications.

My minimalist filtering reduces the computational load of any kernel filter by 40% on the average. In contrast with conventional methods, the method is not limited to specific filter functions. The method can be used with arbitrary shaped kernel, without an increase in computational costs, which is an indispensable property for template detection tasks, such as shape matching in computer vision applications.

The method can be used for data of any dimension, such as 3D volumetric smoothing, and multi-spectral filtering. The amount of memory required is very small, which makes the method a candidate for hardware implementations. Furthermore, the method can be implemented in a parallel, or on specific hardware such as GPUs. It should also be noted, that the method can be used with pyramid representations. Also, lower dimensional separable basis can benefit from the minimalist filtering.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A computer implemented method for filtering input data with a kernel filter, comprising the steps of:

defining a kernel filter S in a d-dimensional real valued Cartesian space $R^d$, in which the kernel filter maps input data I within the kernel filter centered around an input data point $p=[x_1, \ldots, x_d]$ in the space, to corresponding m-dimensional output data points $I(p; S) \to y(p) = [y_1, \ldots, y_m]$, and in which filter assigns a real valued coefficient f(p) to each of the input data points p in the kernel filter;

determining a set of unique filter coefficients $w_i$, $i=1, \ldots, U$ for the kernel filter;

constructing a linkage set $L_i$ for each unique filter coefficient $w_i$ such that the linkage set includes relative links to positions in the kernel filter that have identical filter coefficients $L_i = \{l_{i0}, \ldots, l_i L_i\}$, in which each relative link $l_{ij}$ is an inverse of the position of the unique filter coefficient; and processing each input data point by multiply values on which the kernel filter is centered by each of the unique filter coefficients, and adding results of the multiplying to the corresponding output data points as referenced by the relative links:

$$w_1 I(p) \to y(p + l_{11}), \ldots, y(p + l_{1L_1})$$
$$\vdots \to \vdots$$
$$w_U I(p) \to y(p + l_{U1}), \ldots, y(p + l_{UL_U}).$$

2. The method of claim 1, in which the input data are bounded within a range $N_1, \ldots, N_d$, where $0 \leq x_i < N_i$.

3. The method of claim 2, in which a single channel image kernel filter is defined in two dimensions, and color and video kernel filters are defined in three dimensions.

4. The method of claim 1, in which a response of the kernel filter is $$y(p) = \sum_{k \in S} f(k) I(k + p).$$

5. The method of claim 1, in which m=1, and the kernel filter maps to a scalar, and $y(p)=y_1$.

6. The method of claim 1, in which the position in the kernel filter is $(x_1, x_2)$ and the relative link is $(-x_2, -x_2)$ with respect to indexing the kernel filter.

7. The method of claim 1, in which the unique filter coefficients and the relative links are predetermined one time for the kernel filter in a preprocessing phase.

8. The method of claim 1, further comprising:
determining $p_{ij}=(x_1(i,j), x_2(i,j))$ and $l_{ij}=(-x_1(i,j), -x_2(i,j))$ for each input data point.

9. The method of claim 1, in which the input data are pixels in an image, and the kernel filter is swept across the image in a selected order, and further comprising:
weighting each input data point $I(x_1, x_2)$ using the corresponding relative links.

10. The method of claim 1, in which each input data point is multiplied only once by each unique filter coefficient, while adding the results of the multiplying to the corresponding output data points using the corresponding relative links.

11. The method of claim 1, further comprising:
determining a summation $$y(p) = \sum_i^U \left( w_i \sum_j^{L_j} I(p + l_{ij}) \right).$$

12. The method of claim 1, in which the kernel filter is selected from a group comprising quad-symmetric filters, Gabor filters, moving average filters, gray level morphological operator filters, volume smoothing functions, Gaussian filters, sinc filters, and low-pass filters.

13. The method of claim 1, in which the kernel filter has an arbitrary shape and size.

14. The method of claim 1, in which the kernel filter is a linear filter.

15. The method of claim 1, in which the input data points are processed simultaneously in parallel by accumulating the results to the corresponding output data points.

* * * * *